(12) United States Patent
Griggs

(10) Patent No.: US 7,700,661 B2
(45) Date of Patent: Apr. 20, 2010

(54) PRIME FOAM CONTAINING VEGETABLE OIL POLYOL

(75) Inventor: William Griggs, Southaven, MS (US)

(73) Assignee: Sleep Innovations, Inc., West Long Branch, NJ (US)

( * ) Notice: Subject to any disclaimer, the term of this patent is extended or adjusted under 35 U.S.C. 154(b) by 9 days.

(21) Appl. No.: 11/429,511

(22) Filed: May 5, 2006

(65) Prior Publication Data

US 2006/0270747 A1 Nov. 30, 2006

Related U.S. Application Data

(60) Provisional application No. 60/678,123, filed on May 5, 2005.

(51) Int. Cl.
*C08G 18/00* (2006.01)
*C08L 91/00* (2006.01)

(52) U.S. Cl. .................... 521/170; 528/74.5

(58) Field of Classification Search .................. 521/51, 521/170, 172
See application file for complete search history.

(56) References Cited

U.S. PATENT DOCUMENTS

| | | | |
|---|---|---|---|
| 2,787,601 A | 4/1957 | Detrick, et al. | |
| 2,833,730 A | 5/1958 | Barthel, Jr. | |
| 3,969,262 A | 7/1976 | Wagner et al. | |
| 4,185,146 A | 1/1980 | Burke | |
| 4,264,743 A * | 4/1981 | Maruyama et al. | 521/101 |
| 4,722,946 A * | 2/1988 | Hostettler | 521/158 |
| 5,478,897 A * | 12/1995 | Sasano et al. | 525/453 |
| 6,034,197 A | 3/2000 | Mahon et al. | |
| 6,071,977 A | 6/2000 | Austin et al. | |
| 6,180,686 B1 | 1/2001 | Kurth | |
| 6,391,933 B1 | 5/2002 | Mattesky | |
| 6,573,354 B1 * | 6/2003 | Petrovic et al. | 528/1 |
| 6,649,667 B2 * | 11/2003 | Clatty | 521/170 |
| 2002/0121328 A1 * | 9/2002 | Kurth et al. | 156/72 |
| 2004/0014830 A1 * | 1/2004 | Wiese et al. | 521/155 |

* cited by examiner

*Primary Examiner*—Mark Eashoo
*Assistant Examiner*—Liam J Heincer
(74) *Attorney, Agent, or Firm*—McCarter & English, LLP

(57) ABSTRACT

A polyurethane foam created from a formulation comprising from about 1 percent to about 70 percent of a vegetable oil polyol is disclosed. The polyurethane foam is made from a formulation comprising an isocyanate, a surfactant, and a polyol blend comprising a vegetable oil polyol. Also disclosed is a polyurethane foam made from a formulation comprising a polyol blend comprising a petrochemical polyol and a vegetable oil polyol, and an isocyanate blend comprising a 2, 4 toluene diisocyanate (TDI) isomer and a 2, 6 TDI isomer, wherein the ratio of petrochemical polyol to vegetable oil polyol in the polyol blend is about equal to the ratio of the 2, 4 TDI isomer to the 2, 6 TDI isomer in the isocyanate blend.

3 Claims, 1 Drawing Sheet

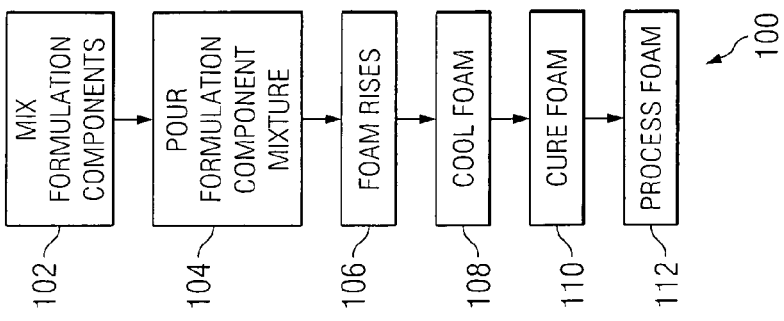
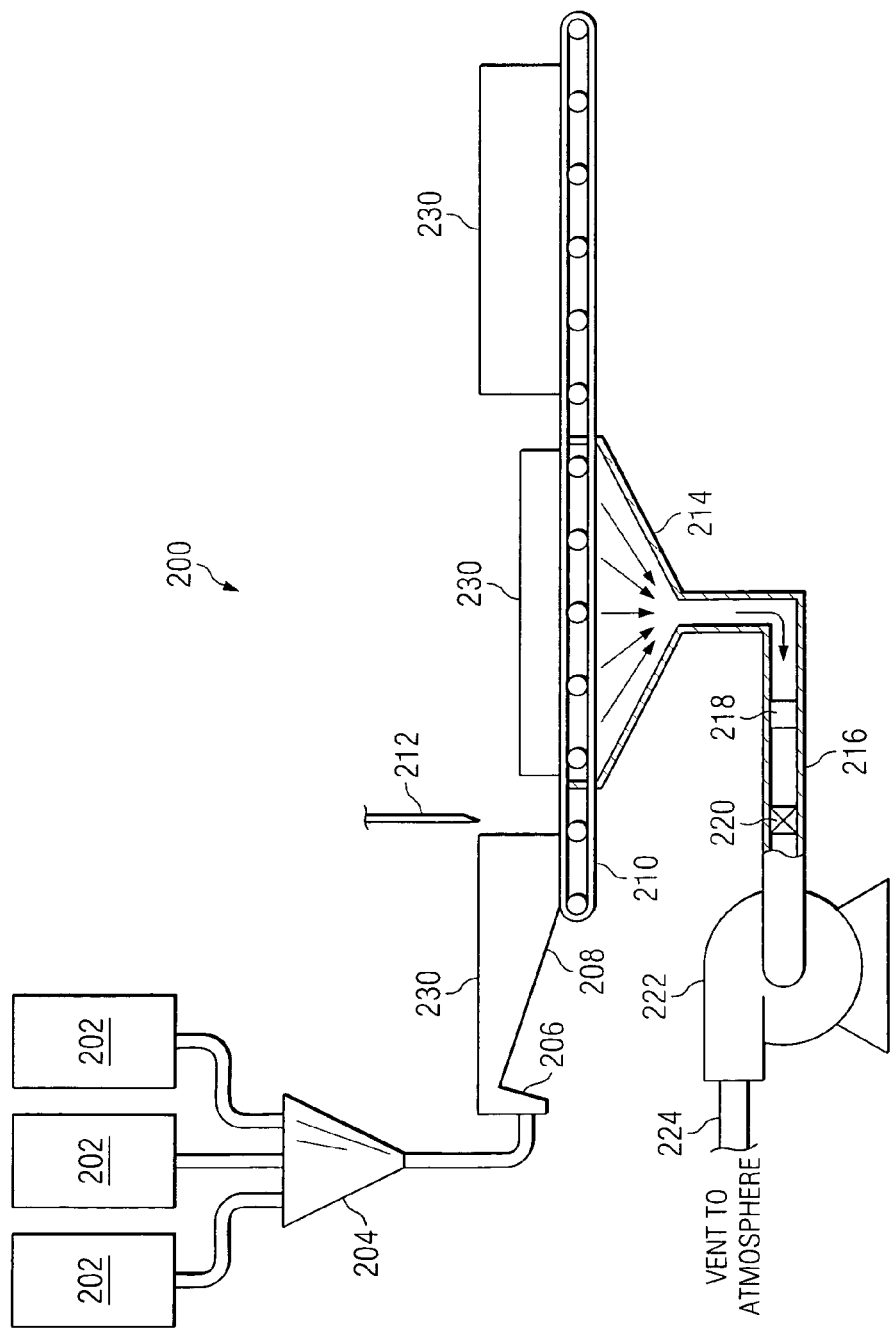

PRIME FOAM CONTAINING VEGETABLE OIL POLYOL

CROSS-REFERENCE TO RELATED APPLICATIONS

This application claims priority from U.S. Provisional Application 60/678,123 filed May 5, 2005, which is incorporated by reference as if reproduced in its entirety.

STATEMENT REGARDING FEDERALLY SPONSORED RESEARCH OR DEVELOPMENT

Not applicable.

TECHNICAL FIELD

The present disclosure relates generally to polyurethane foam and more specifically to polyurethane foam formulations containing vegetable oil polyol. The present disclosure further relates to methods for producing a prime foam from a component mixture formulated to include a vegetable oil polyol such as castor oil polyol.

BACKGROUND OF THE INVENTION

Polyurethane foam is produced by mixing isocyanate, polyol, and water to create two simultaneous reactions: a gelling or polymerization reaction and a blowing or gas-producing reaction. The gelling reaction occurs when the isocyanate reacts with the polyol to form urethane chains. The blowing reaction occurs when the isocyanate reacts with the water to form carbon dioxide gas. The urethane chains make up the structure of the foam, while the carbon dioxide gas creates porosity within the foam by expanding the polyurethane polymer. Numerous additives may be mixed with the isocyanate, polyol, and water to control the rate and duration of the gelling and blowing reactions, while also providing a mechanism for urethane chain cross-linking and chain extension. By controlling the rate and duration of the gelling and blowing reactions, the polyurethane foam production facility can control the physical properties of the foam such that the resultant product has a desired set of characteristics. When the gelling and blowing reactions are completed and the foam has had sufficient time to fully cure, the resulting polyurethane foam bun may be processed into various polyurethane foam products.

It is desirable for the resultant foam product to have certain advantageous properties. For example, the foam may be required to be substantially white with little to no yellowing. Additionally, depending on the end-use application, the foam may be required to have substantially no odor associated with it. It is also preferable that the foam minimize its volatile organic compound (VOC) content or emissions. Finally, it is advantageous for the foam to be made from renewable energy sources so that the foam can be marketed as environmentally friendly or "green."

BRIEF SUMMARY OF THE DISCLOSURE

In one aspect, disclosed herein is a polyurethane foam created from a formulation comprised of between about 1 percent and about 70 percent of a vegetable oil polyol. In alternate embodiments thereof, the formulation further comprises between about 5 percent and about 25 percent of the vegetable oil polyol or between about 8 percent and about 12 percent of the vegetable oil polyol. In further alternate embodiments thereof, the vegetable oil polyol has a hydroxyl number between about 150 mg KOH/g and about 175 mg KOH/g 1 or a hydroxyl number between about 50 mg KOH/g and about 60 mg KOH/g. In still further alternate embodiments thereof, the vegetable polyol has an acid value of not more than about 3 mg KOH/g or between about 4 mg KOH/g and about 9 mg KOH/g. In still yet further alternate embodiments thereof, the vegetable oil polyol is a castor oil polyol or a soy oil polyol.

In another aspect, disclosed herein is a polyurethane foam made from a formulation comprised of an isocyanate, a surfactant, and a polyol blend which includes a vegetable oil polyol. In one embodiment, the formulation comprises about 100 parts of the polyol blend; between about 40 parts and about 60 parts of the isocyanate; and between about 0.1 parts and about 3 parts of the surfactant. Variously, the vegetable oil polyol comprises between about 5 percent and about 95 percent of the polyol blend, between about 10 percent and about 50 percent of the polyol blend, or between about 15 percent and about 25 percent of the polyol blend.

In still another aspect, disclosed herein is a polyurethane foam made from a formulation comprised of a polyol blend which includes a petrochemical polyol and a vegetable oil polyol; and an isocyanate blend which comprises a 2, 4 toluene diisocyanate (TDI) isomer and a 2, 6 TDI isomer. In further accordance with this aspect, the ratio of petrochemical polyol to vegetable oil polyol in the polyol blend is about equal to the ratio of the 2, 4 TDI isomer to the 2, 6 TDI isomer in the isocyanate blend. In one embodiment thereof, the petrochemical polyol is a polyether polyol. In another, the vegetable oil polyol is a castor oil polyol having a hydroxyl number from about 155 mg KOH/g to about 175 mg KOH/g and an acid value not more than about 3 mg KOH/g.

The foregoing has outlined rather broadly the features and technical advantages of the subject matter set forth herein in order that the detailed description which follows may be better understood. It should be appreciated by those skilled in the art that the conception and the specific embodiments disclosed herein may be readily utilized as a basis for modifying or designing other structures for carrying out the same purposes of the present invention. It should also be realized by those skilled in the art that such equivalent constructions do not depart from the spirit and scope of the subject matter which is defined only by the claims appended hereto.

BRIEF DESCRIPTION OF THE DRAWINGS

FIG. 1 is a block diagram of one embodiment of a method for producing the foam.

FIG. 2 is a side view of an example of an apparatus for implementing the method for producing the foam.

DETAILED DESCRIPTION OF THE PREFERRED EMBODIMENTS

Disclosed herein are foam products containing a vegetable oil polyol and methods of producing the same. In an embodiment, the foam product is a prime polyurethane foam. The foam may be produced by the reaction of an isocyanate, a polyol, water and additives as needed to impart desired properties. In further embodiments thereof, the vegetable oil polyol comprises castor oil polyol or soy oil polyol and the resultant foam has improved physical properties such as an improved color and/or odor when compared to an otherwise identical foam lacking the castor oil polyol or the soy oil polyol.

In one embodiment, the formulation includes the polyol. As used herein, the term polyol is intended to encompass any type of polyol, such as diol, triol, tetrol, polyol, or blends thereof and specifically includes both polyether and polyester polyols. The polyol is generally selected based on its hydroxyl number, molecular weight, and processing conditions as recommended by the manufacturer. Examples of suitable polyols include: ethylene glycol, propylene glycol, butylene glycol, hexanediol, octanediol, neopentyl glycol, 1,4-bishydroxymethyl cyclohexane, 2-methyl-1,3-propane diol, glycerin, trimethylolethane, hexanetriol, butanetriol, quinol, polyester, methyl glucoside, triethyleneglycol, tetraethylene glycol, polyethylene glycol, dipropylene glycol, polypropylene glycol, diethylene glycol, glycerol, pentaerythritol, trimethylolpropane, sorbitol, mannitol, dibutylene glycol, polybutylene glycol, alkylene glycol, oxyalkylene glycol, ethylene glycol, diethylene glycol, dipropylene glycol, triethylene glycol, tripropylene glycol, tetraethylene glycol, tetrapropylene glycol, trimethylene glycol, tetramethylene glycol, 1,4-cyclohexanedimethanol (1,4-bis-hydroxymethylcyclohexane), vegetable oil polyols, and mixtures thereof. Specific examples of suitable polyols are the VORANOL® line, including 3136, 3137A, and 4001, available from the Dow Chemical Corporation of Midland, Mich., the ALCUPOL® line of polyols available from Repsol YPF of Madrid Spain, the LUPRANOL, PLURACOL, and LUPRAPHEN lines available from BASF Aktiengesellschaft of Ludwigshafen, Germany, and one or more of SP-168, SP-170, SP-238, and SP-2744 available from the Peterson Chemical Supply LLC of Strawberry Point, Iowa. Of course, the foregoing polyols are identified for purely exemplary purposes and it is fully contemplated that the formulation may include other suitable polyols not specifically disclosed herein. Although the amount of polyol included in the formulation may vary, generally the amount of polyol is fixed at one hundred parts such that the other formulation components can be measured relative to the polyol, e.g. in parts-per-hundred (pph).

In embodiments, the polyol comprises a vegetable oil polyol and may optionally be substantially free of petrochemical polyols. As opposed to petrochemical polyols that are produced from crude oil and other petroleum sources, vegetable oil polyols are derived from plants and other renewable natural sources. Vegetable oil polyols are primarily triglycerides of fatty acids, which are composed of a carboxyl group attached to a longer chain of hydrocarbons. The vegetable oil polyols can be saturated, that is they do not contain any carbon-carbon double bonds, or unsaturated such that they contain carbon-carbon double bonds. Each vegetable oil polyol has a different distribution and concentration of carbon-carbon double bonds and hydroxyl groups. As a result, each vegetable oil polyol gives the foam different characteristics with respect to reaction speed and completion, viscosity, and composition. It is these differences in derivation and chemical structure are what distinguish the vegetable oil polyol from the petrochemical polyol.

Examples of vegetable oil polyols suitable for the purposes contemplated herein include, without limitation, those vegetable oil polyols produced from any naturally occurring vegetable oil, such as soy oil, castor oil, safflower oil, sesame oil, peanut oil, cottonseed oil, olive oil, linseed oil, palm oil, canola oil, and blends thereof. Specific example of suitable soy oil polyols are AGROL, including AGROL 3.0, available from BioBased Technologies of Rogers, Ark., and SOYOL, including SOYOL R2-052, available from Urethane Soy Systems Company of Volga, S. Dak. SOYOL R2-052 is a two functional polyol made from unmodified soybean oil and having a hydroxyl number (ASTM D4274-99) between about 52 milligrams of potassium hydroxide per gram (mg KOH/g) and about 56 mg KOH/g and an acid value (ASTM D4662-03) between about 5.4 mg KOH/g and about 7.4 mg KOH/g. SOYOL R2-052 also has a moisture content (ASTM D4672-00) of no more than about 0.1 weight percent and a viscosity (ASTM D4878-03) between about 2500 centipoise (cp) and about 4,000 cp. Of course, a person of ordinary skill in the art will appreciate that the aforementioned list is not exhaustive and that other vegetable oils exist that are also suitable for the purposes contemplated herein.

The formulation may contain various amounts of the vegetable oil polyol. In alternate embodiments thereof, the formulation may comprise between about 5 parts and about 100 parts of the vegetable oil polyol, between about 10 parts and about 50 parts of the vegetable oil polyol, or between about 15 parts and about 25 parts of the vegetable oil polyol. In another embodiment, the formulation comprises about 100 parts of the vegetable oil polyol and all of the other formulation components are measured in pph based upon the vegetable oil polyol. In yet another embodiment, the polyol is a blend comprised of a vegetable oil and a petrochemical-based polyol. In such embodiments, the polyol blend may, in the alternative, be comprised of between about 5 percent and about 95 percent of the vegetable oil polyol with the remainder of the blend being the petrochemical polyol, t between about 10 percent and about 50 percent of the vegetable oil polyol with the remainder of the blend being the petrochemical polyol, or between about 15 percent and about 25 percent of the vegetable oil polyol with the remainder of the blend being the petrochemical polyol.

While use of any vegetable oil polyol in the formulation produces the benefits described herein, some vegetable oils require chemical processing before they are suitable for use as a vegetable oil polyol. For example, crude soy oil consists of about 17 percent saturated triglycerides and about 83 percent unsaturated triglycerides, with about 4.41 double bonds per triglyceride molecule. To convert crude soy oil into a preferred soy oil polyol, the crude soy oil may be functionalized. Functionalization is a process by which hydroxyl groups are added to the unsaturated portions of the molecule. Functionalization can be accomplished through hydroxylation, the addition of hydroxyl groups to the molecule. In some crude soy oils, the saturated portion of the triglyceride cannot be functionalized and, as a result, about 17 percent of the soy oil cannot be converted into a polyol. Consequently, in order to maximize the environmental and economic benefits of the vegetable oil polyol, the preferred vegetable oil polyols are made from vegetable oils that require minimal processing to become suitable for use as a vegetable oil polyol. Especially preferred are those vegetable oils that require minimal changes in their chemical structure in order to be suitable for use as the vegetable oil polyol.

In that castor oil does not require excess processing steps to be suitable for use as a polyol, castor oil polyol is, under many circumstances, preferred over other types of vegetable oil polyols. Unlike other vegetable oils that require substantial processing to be suitable for use as the polyol, castor oil does not require any chemical processing steps, such as hydroxylation, esterfication, etherification, and so forth, which would modify the chemical structure of the castor oil, thereby making it suitable for use as the polyol. Generally, the castor oil is cleaned and filtered to remove solids from the oil. The castor oil may also be dried to reduce the moisture content within the castor oil. Optionally, the castor oil may be polymerized to increase its molecular weight. In this regard, it should be noted, however, that polymerization merely connects the individual castor oil molecules together and does not substantially change the chemical structure of the underlying castor oil. It should be further noted that, while different grades of castor oils can be obtained through various refining process steps, thereby resulting in different functionalities, hydroxyl numbers, and molecular weights, it is generally preferred that the castor oil molecules remain substantially unmodified. Examples of castor oil polyols suitable for the purposes disclosed herein include CRYSTAL®0, CRYSTAL® CROWN, POLYOL 3000 and POLYOL 3400, all of which are manufactured by the CasChem Division of Rutherford Chemicals LLC of Bayonne, N.J. Of the foregoing, POLYOL 3000 is clear to slightly hazy in color, has a Gardner color no more than about 3+, a hydroxyl value between about 160 mg KOH/g and about 168 mg KOH/g, an acid value of no more than about 2.5 mg KOH/g, a Karl Fischer moisture content of no more than about 0.35 percent, and a viscosity at 25° C. of between about 68 centistokes (cs) and about 78 cs.

Castor oil polyol is often preferred over other vegetable oil polyols because it has a combination of desirable chemical properties. More specifically, castor oil consists of about 90 percent ricinoleic acid, an 18 carbon acid having a double bond between the 9th and 10th carbons and a hydroxyl group on the 12th carbon. This combination of unsaturated carbon bonds and a hydroxyl group is rare and only occurs in a few vegetable oils, one of which is castor oil. Castor oil polyol also has a relatively high hydroxyl number, typically in the range of about 150 to about 175. In contrast, chemical polyols have a substantially lower hydroxyl number, typically in the range of about 40 to about 70. Castor oil also generally has an acid value less than about 2.5 weight percent. Generally, the higher hydroxyl number and/or low acid number characterizing castor oil polyol, means that, compared to petrochemical polyols, less castor oil polyol is required to react with a given amount of isocyanate. Thus, the combination of chemical structure and high hydroxyl number makes castor oil polyol more chemically efficient than the petrochemical polyol for use in the formulations.

In addition to its chemical properties, castor oil is often preferred over other vegetable oils because of a number of physical properties. For example, castor oil has a lower oxidation rate than many of the other vegetable oil polyols. Thus, the castor oil polyol has a longer shelf life than many of the other vegetable oil polyols. In addition, the castor oil polyol has a clear color. This compares favorably to other vegetable oil polyols typically characterized by a brown or yellow color. The clear color is preferred because it does not change the color of the foam, whereas the yellow or brown color in other vegetable oil polyols affects the color of the foam.

Furthermore, castor oil polyol has a viscosity of about 400 cp. In contrast, other vegetable oil polyols tend to have a viscosity of at least 3,500 cp. As the viscosity of other vegetable oils is substantially higher than that of castor oil polyol, process oils having a viscosity of between about 30 and about 50 cp are often added to formulations which include high viscosity vegetable oil polyols, for example, those vegetable oil polyols having a viscosity of at least 3,500 cp, to reduce the viscosity to a more preferred level of less than about 1,000 cp. When process oils must be added to reduce the overall viscosity of the formulation, the cost of the formulation is increased. In contrast, lesser amounts of process oil are typically added to castor oil polyol. As a result, in contrast to formulations which include other vegetable oil polyols, the cost of formulations which include castor oil polyol are less likely to be adversely affected by the use of process oils. Finally, while the inclusion of any vegetable oil polyol imparts some additional odor to the foam, the odor of castor oil polyol is not as strong as other vegetable oil polyols resulting in less of a retained odor in the foam.

There are several benefits to using vegetable oil polyol to manufacture the foam. Use of the vegetable oil polyol causes the foam manufacturing process to produce less VOCs than are produced using the petrochemical polyol. Moreover, because vegetable oil polyols are produced from plants, they are a renewable raw material and are thus more environmentally friendly. Furthermore, because the vegetable oil polyol has a higher hydroxyl number than petrochemical polyols, less vegetable oil polyol is needed in the formulations to achieve the required excess free isocyanate percentage compared to petrochemical polyols, resulting in less polyol use and lower raw material costs. The required free isocyanate content is also less with vegetable oil polyol, resulting in less polyol use and lower costs. For example, a free isocyanate content of about 8 percent to about 10 percent results is acceptable for vegetable oil polyol versus the free isocyanate content of about 10 percent to about 12 percent that is required for petrochemical polyol.

In one embodiment, the formulation includes the isocyanate. The isocyanate reacts with the polyol to form the urethane chains, links, or struts within the foam and with the water to create gas within the foam. The isocyanate may be any type of isocyanate, such as toluene diisocyanate (TDI), diisocyanatodiphenyl methane (MDI), or blends thereof. One example of a suitable isocyanate is 80/20 TDI, which is a blend comprising 80 percent of the 2, 4 isomer of TDI and 20 percent of the 2, 6 isomer of TDI. Examples of other suitable isocyanates include: m-phenylene diisocyanate, p-phenylene diisocyanate, polymethylene polyphenyl-isocyanate, 2,4-toluene diisocyanate, 2,6-toluene diisocyanate, 4,4-diisocyanatodiphenyl methane, dianisidine diisocyanate, bitolylene diisocyanate, naphthalene-1,4-diisocyanate, diphenylene-4,4'-diisocyanate, xylylene-1,4-diisocyanate, xylylene-1,2-diisocyanate, xylylene-1,3-diisocyanate, bis(4-isocyanatophenyl)-methane, bis(3-methyl-4-isocyanatophenyl)-methane, 4,4-diphenylpropane diisocyanate, isophorone diisocyanate, hexamethylene diisocyanate, methylene-bis-cyclohexylisocyanate, and mixtures thereof. Examples of suitable isocyanates include, among others, SUPRASEC 7050 and SUPRASEC 304, both of which are available from Huntsman International LLC of Salt Lake City, Utah and VORANATE T-80 available from the Dow Chemical Corporation of Midland, Mich. Of course, it should be clearly understood that the specific isocyanates disclosed herein are merely provided by way of example and that isocyanates other than those specifically disclosed herein may be suitable for use in the formulation. In embodiments, from about 10 pph to about 150 pph, from about 30 pph to about 70 pph, or from about 40 pph to about 60 pph isocyanates are present in the formulation. In one embodiment, it is advantageous to have a petrochemical polyol/vegetable oil polyol blend that has a similar blend ratio to the 2, 4 isomer TDI/2, 6, isomer TDI blend. Thus, in one embodiment, the ratio of petrochemical polyol to vegetable oil polyol in the polyol blend is about equal to the ratio of the 2, 4 TDI isomer to the 2, 6 TDI isomer in the isocyanate blend.

One aspect of the formulation is an isocyanate index, which is one factor affecting the physical properties of the foam. The isocyanate index or merely "the index" is the stoichiometric amount of isocyanate needed to react with the active hydrogen components in the polyol. An index of 100 indicates that the formulation contains stoichiometrically equal amounts of isocyanate and active hydrogen components in the polyol. Indexes less than 100 indicate that the formulation contains an excess amount of polyol, whereas indexes above 100 indicate that the formulation contains an excess amount of isocyanate. Thus, an isocyanate index of 102 means that the formulation contains 102 percent of the amount of isocyanate stoichiometrically required to react with all active hydrogen components in the polyol.

In one embodiment, the formulation includes a blowing agent. Water is an example of a suitable blowing agent; however the blowing reaction between isocyanate and water is exothermic and substantially increases the risk of the foam scorching, splitting, or igniting. Thus, inert blowing agents, such as CFCs, acetone or methylene chloride, have been employed to replace some of the water in the formulation. However, the use of CFCs and methylene chloride in the foam is generally discouraged because of the harmful effect these materials have on the environment. Consequently, in another embodiment, carbon dioxide is used as a blowing agent as a replacement for some or all of the CFCs, methylene chloride, and/or water. The carbon dioxide is typically mixed with the other formulation components at high pressure and low temperature such that the carbon dioxide remains in a liquid state. Carbon dioxide is advantageous because it not only expands thereby acting as a blowing agent to rise the foam, but also cools the foam as it expands, thereby reducing the overall foam temperature increase caused by the other exothermic chemical reactions within the foam. In embodiments, from about 0.01 pph to about 50 pph, from about 0.1 pph to about 20 pph, or from about 1 pph to about 5 pph of the blowing agent are present in the formulation.

In one embodiment, the formulation includes a catalyst. Catalysts are generally classified as either blowing catalysts or gelling catalysts, but some catalysts may act as both the blowing catalyst and the gelling catalyst. Blowing catalysts are generally tertiary amine catalysts and primarily catalyze the blowing reaction that creates porosity in the foam. Examples of suitable blowing catalysts include: trimethylamine, triethylenediamine, tetramethylethylenediamine, bis(2-dimethylaminoethyl) ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, dimethylethanolamine, tetramethylpropanediamine, methyltriethylenediamine, 2,4,6-tri(dimethylaminomethyl)phenol, dimethylamino pyridine, dimethylaminoethanol, N,N',N"-tris(dimethylaminopropyl)-sym-hexahydrotriazine, 2-(2-dimethylaminoethoxy)ethanol, tetramethyl propanediamine, trimethylaminoethylethanolamine, dimorpholinodiethylether (DMDEE), N-methylimidazole, dimethylethylethanolamine, methyl triethylenediamine, N-methylmorpholine, and mixtures thereof. A specific example of a suitable blowing catalyst is the NIAX® line, including NIAX® A33, NIAX® A133, and NIAX® C-324, available from GE Advanced Materials of Pittsfield, Mass., and the JEFFCAT® line of urethane catalysts, including JEFFCAT® ZF-10 and JEFFCAT® LS-15, both available from Huntsman International LLC of Salt Lake City, Utah.

Gelling catalysts are generally organo-tin catalysts and primarily catalyze the gelling reaction that creates the urethane chains, links, or struts within the foam. Examples of suitable gelling catalysts include: stannous or stannic compounds, stannous salts of carboxylic acids, stannous acylate, trialkyltin oxide, dialklyltin dihalide, dialkyltin oxide, dibutyltin dilaurate, dibutyltin diacetate, diethyltin diacetate, dihexyltin diacetate, di-2-ethylhexyltin oxide, dioctyltin dioxide, stannous octoate, stannous oleate, and mixtures thereof. Specific examples of suitable gelling catalysts include TCAT 110, TCAT 150, both of which are available from Gulbrandsen Manufacturing, Inc. of Orangeburg, S.C. and Chemicals, K-19 and K-29, both of which are available from Goldschmidt Chemical Corp. of Hopewell, Va. Of course, persons of ordinary skill in the art will appreciate that the foregoing catalysts are identified for purely exemplary purposes and it should be clearly understood that the formulation may include catalysts other than those specifically disclosed herein. In various embodiments thereof, total catalyst levels present in the formulation may range between about 0.01 pph and about 10 pph, between about 0.05 pph and about 1 pph, or between about 0.2 pph and about 0.5 pph of the catalysts.

In an embodiment, the formulation includes a surfactant. Surfactants are chemical compounds that affect the surface tension of liquids. Numerous types of surfactants are commercially available, including siloxane polyalkyleneoxide and octamethylcyclotetrasiloxane. An example of a suitable surfactant is the NIAX® silicone line of products, including NIAX® L-618, NIAX® L-635, and NIAX® L-650, all of which are available from GE Advanced Materials of Pittsfield, Mass. Of course, it should be clearly understood that the specific surfactants disclosed herein are merely provided by way of example and that surfactants other than those specifically disclosed herein may be suitable for the uses contemplated herein as long as they affect the surface tension of the formulation. While the formulation may be substantially free of surfactants, in various embodiments thereof, the formulation for the foam may contain between about 0 pph and about 10 pph, between about 0.01 pph and about 5 pph, or between about 0.1 pph and about 2.5 pph of the surfactant. In other embodiments, the formulation for the foam contains no more than about 10 weight percent, between about 0.01 weight percent and about 2.5 weight percent, or between about 0.1 weight percent and about 0.5 weight percent of the surfactant.

In an embodiment, the formulation includes a foam processing aid. Foam processing aids are chemical compounds or chemical compound blends that improve the foaming properties of the foam. Generally, foam processing aids are blends of high hydroxyl number polyether or polyester polyols with other substances, such as dimethylcyclohexylamine and dipropylene glycol. Examples of suitable foam processing aids are the GEOLITE® modifier line, including GEOLITE® GM-206 and GEOLITE® GM-210, or the NIAX® modified line, including NIAX® DP-1022, all of which are available from GE Advanced Materials of Pittsfield, Mass. Another suitable foam processing aid is SP-370 available from Peterson Chemical Supply LLC of Strawberry Point, Iowa. Of course, it should be clearly understood that the specific foam processing aids disclosed herein are merely provided by way of example and that foam processing aids other than those specifically disclosed herein may be suitable for the uses contemplated herein as long as they improve the foaming properties of the foam. In embodiments, the formulation for the foam contains between about 0 pph and about 10 pph, between about 0.01 pph and about 5 pph, or between about 0.1 pph and about 2.5 pph of the foam processing aid. In other embodiments, the formulation for the foam contains from about 0 weight percent to about 10 weight percent, from about 0.01 weight percent to about 2.5 weight percent, or from about 0.1 weight percent to about 0.5 weight percent of the foam processing aid.

The formulation may also include one or more other additives that individually or collectively improve one or more characteristics of the foam. These additives may include: flame retardants, antimicrobial chemical compounds, antioxidants, pigments, dyes, cross-linkers, stabilizers, and chain extenders. Of the foregoing types of additives, flame retardant chemical compounds, such as melamine, expandable graphite, or dibromoneopentyl glycol, improve the flame retardant properties of the foam product. Specific examples of suitable FR agents are FM-552 available from Great Lakes Chemical Corporation of West Lafayette, Ind., HF-4 available from Supresta of Ardsley, N.Y. or CP-2 available from Gulbrandsen Manufacturing, Inc. of Orangeburg, S.C. Antimicrobial chemical compounds, such as zinc pyrithione can be used to improve the antimicrobial properties of the foam. The addition of antimicrobial chemical compounds to foam is described in U.S. patent application Ser. No. 10/840,309 entitled "Anti-Microbial Carpet Pad and Method of Making" filed May 6, 2004 and incorporated herein by reference as if reproduced in its entirety. Other antimicrobial chemical compounds, such UltraFresh® DM-50 available from Thompson Research Associates, Inc. of Toronto, Canada, have been used to improve the antimicrobial properties of the foam. In addition, various antioxidants and/or anti-scorch additives such as CS-15 available from GE Advanced Materials of Pittsfield, Mass. improve the resistance of the foam to oxidative-type reactions, such as scorch resulting from high exothermic temperatures. Dyes and/or pigmented colors, such as blue, green, yellow, orange, red, purple, brown, black, white, or gray, may be used to create certain colors within the foam based on customer requirements and to distinguish various grades of foam. Dyes such as X-3 (blue), X-15 (yellow), X-38 (orange), X-64 (red), and X-96 may also be used in the formulation. Other formulation additives such as such as foam stabilizers, cross-linkers, and chain extenders may also be included in the formulation as known to one of ordinary skill in the art. The aforementioned additives may alternatively or additionally be present in the formulation. Of course, it is fully contemplated that the formulation may include other additives for improving these or other characteristics of the foam. Accordingly, it should be clearly understood that the additives disclosed herein are set forth purely by way of example and it is fully contemplated that the foam may also include any number of other additives not specifically recited herein as long as they are compatible with the desired characteristics of the foam.

The physical properties of the foam indicate whether the foam is a conventional, high resilience (HR), or viscoelastic foam. Conventional flexible slabstock polyurethane foam typically contains a majority of open cells and has greater air permeability characteristics than either HR or viscoelastic foam. In embodiments, the conventional polyurethane foam embodiment has a density from about 0.1 pounds per cubic foot (pcf) to about 10 pcf, from about 0.5 pcf to about 5 pcf, or from about 0.8 pcf to about 3.5 pcf. The firmness of the foam is measured by its indentation force deflection (IFD). Although the firmness of the foam is generally measured as the 25 percent IFD, the firmness may be measured in other IFD amounts, such as 65 percent IFD. In embodiments, the conventional polyurethane foam embodiment has an IFD from about 1 pound to about 200 pounds, from about 3 pounds to about 100 pounds, or from about 5 pounds to about 50 pounds. Moreover, the conventional polyurethane foam embodiment of the foam may have an index from about 60 to about 150, from about 80 to about 130, or from about 95 to about 120.

In contrast, HR foam is differentiated from conventional foam by its increased amount of closed cells within the foam, higher comfort or support factor, and higher resilience. In one embodiment, HR foam has a ball rebound value of greater than 50 percent. The lower resilience, conventional foam typically has a ball rebound value of less than about 55 percent and often below about 50 percent. In embodiments, the HR foam embodiment has a density from about 0.9 pcf to about 12 pcf, from about 1.4 pcf to about 7 pcf, or from about 1.8 pcf to about 3.5 pcf. In embodiments, the HR polyurethane foam embodiment has an IFD from about 5 pounds to about 70 pounds, from about 10 pounds to about 50 pounds, or from about 20 pounds to about 40 pounds. Furthermore, the HR polyurethane foam embodiment has an index from about 60 to about 150, from about 80 to about 130, or from about 100 to about 115.

Further in contrast, viscoelastic foam is differentiated from both conventional foam and HR foam in that it has both viscous and elastic properties. Viscoelastic foam is also called memory foam due to its relatively long recovery time after the removal of a compressive force. In embodiments, the viscoelastic polyurethane foam embodiment has a density from about 1 pcf to about 10 pcf, from about 2 pcf to about 6 pcf, or from about 3 pcf to about 5 pcf. In embodiments, the viscoelastic polyurethane foam embodiment of the foam has an IFD from about 1 pound to about 30 pounds, from about 3 pounds to about 20 pounds, or from about 5 pounds to about 13 pounds. In addition, the viscoelastic polyurethane foam embodiment of the foam has an index from about 20 to about 130, from about 50 to about 80, or from about 65 to about 75.

Referring now to FIG. 1, a method for manufacturing a polyurethane foam from castor oil polyol or other vegetable oil polyol will now be described in greater detail. In a broad sense, the method disclosed herein produces the polyurethane foam by mixing a selected formulation which includes a vegetable oil polyol and subsequently producing, in accordance with any one of various means for producing a polyurethane foam known to one skilled in the art, a foam from the prepared formulation. FIG. 1 is a block diagram of one embodiment of a method 100 for producing the polyurethane foam. As may now be seen, the method 100 generally comprises: mixing the formulation components at 102, pouring the mixture into a trough at 104, allowing the reacting polymer to rise and form the foam at 106, cooling the foam at 108, curing the foam at 110, and processing the foam at 112. Each of the aforementioned steps is described in further detail below.

Production of the foam begins with mixing the components of the formulation together at 102. Generally, the formulation components are comprised of a vegetable oil polyol, a isocyanate, a blowing agent, a catalyst, and any additional components. The formulation components are typically stored in individual tanks or other suitable storage facilities and piped, pumped, metered, or otherwise transported to the mixer. The formulation components are then mixed together in the mixer, which may be a static mixer comprised of a plurality of baffles or a dynamic mixer comprised of a plurality of moving agitators. Of course, the mixing of formulation components should not be limited to the mixing methods described herein because persons of ordinary skill in the art are aware of other methods for mixing the formulation components described herein.

Production of the foam continues with the pouring of the formulation into the trough at 104. After all formulation components are mixed together, the reacting polymer is poured into a trough through a snorkel tube in the mix head or through a gate bar or letdown device, depending upon whether the process utilizes carbon dioxide or only water as a blowing agent. The gate bar or letdown device comprises a Cannon-Viking gatebar that is from about 1.8 to about 2 meters wide and is fitted with a shim to vary the slot exit velocity and pressure of the reacting foam as the pressure is decreased to atmospheric when the foam is released onto the fall plates. For carbon dioxide-blown foams, carbon dioxide is cooled and pressurized so that it remains dissolved in polyol once it is fed into the high-pressure polyol stream.

Once the carbon dioxide/polyol solution and other formulation components exit the gatebar, the carbon dioxide expands as the pressure is released. Alternatively, most other formulation components are fed via positive displacement metering pumps into a manifold that feeds the high-speed mixer. Of course, the pouring of the formulation should not be limited to the foam pouring methods described herein because persons of ordinary skill in the art are aware of foam pouring techniques other than the methods specifically described herein.

Production of the foam continues with the rising of the foam on the fall plate at 106. After the polyurethane foam expands within the trough, it spills over the upper lip of the fall plate, also called a pour plate, and travels down the length of the fall plate. As the foam travels down the fall plate, the gelling and blowing reactions continue to occur within the foam such that the foam is simultaneously falling down the fall plate and rising due to the blowing reaction. The simultaneous rising and falling of the foam generally gives the top of the foam a level appearance from the trough to the end of the fall plate. In some embodiments, the foam may appear to have an inclination either towards the trough or away from the trough due to an imbalance between the change in thickness of the foam and the change in height of the fall plate. After the polyurethane foam travels the length of the fall plate, the foam passes onto a moving conveyor where it is transported down the production line. When the foam reaches a predetermined length, such as sixty feet, the foam is cut using a knife, hot wire, saw, or some other cutting apparatus, thereby separating it into separate bun lengths as it travels down the moving conveyor. Of course, the rising of the foam should not be limited to the foam rising methods described herein because persons of ordinary skill in the art are aware of foam rising methods other than the methods described herein.

Production of the foam continues with the cooling of the foam at 108. After the foam is cut, it is transported to the vacuum table. At this point the temperature of the foam is typically between about 200° F. and about 350° F., and, even more typically, between about 250° F. and about 325° F. Skin is formed on the surfaces of the foam. Therefore, it is desirable to remove these skin surfaces to allow air to pass through the foam to allow cooling during vacuum force curing. When the foam is positioned over the vacuum table, a vacuum source is applied to the bottom of the foam such that air is sucked into the top and sides of the foam and out of the bottom of the foam. The flow of air through the foam causes any VOCs within the foam to exit the foam via the vacuum source. The VOCs that are removed from the foam are subsequently filtered out of the exhaust stream using a pre-filter and a scrubber as described in further detail below. The foam remains on the vacuum table until the foam is cooled to a temperature between about 100° F. and about 160° F. The foam then is transported to a curing, or bun storage area. When producing embodiments of the foam that have low or poor airflow characteristics, such as viscoelastic foam or closed cell HR foam, it is sometimes advantageous not to cool the foam using the vacuum table described herein. Not using the vacuum table may be advantageous because viscoelastic and HR foams possess such low airflow properties that the foam may become permanently flattened during the cooling process, and/or do not require forced air cooling due to the formulation being a low exothermic formulation with no risk of spontaneous combustion due to excessive exothermic cure temperatures. Thus, foams with low or poor airflow characteristics, and/or those that are not at risk of high exothermic temperature may not require forced vacuum cure system using ambient air. Of course, cooling of the foam should not be limited to the foam cooling methods described herein because persons of ordinary skill in the art are aware of foam cooling methods other than the methods described herein.

Production of the foam continues with the curing of the foam at 110. Generally, the foam is allowed to complete most of the reaction requiring at least about 30 minutes prior to vacuum. Higher exothermic formulations require specific cure times before vacuum to prevent the possibility of generating dangerous exothermic temperatures. After vacuum, foam is generally allowed to further cure an additional amount of time, such as between about 24 to about 48 hours. In some embodiments, those formulations that do generate high exothermic reaction temperatures, the curing process merely involves allowing the foam to cool to ambient temperature without vacuuming. In an embodiment, the cure times for these foams range from about 48 to about 72 hours to complete any remaining reactions and to cool the foam to ambient temperature. Of course, curing of the foam should not be limited to the foam curing methods described herein because persons of ordinary skill in the art are aware of foam curing methods other than the methods described herein.

Production of the foam continues with an optional processing of the foam at 112. The foam may be processed into a variety of foam products or merely sold as a bun. In one embodiment, the foam is sliced into layers of a predetermined thickness, such a one-half inch, one inch, or two inches. Such thicknesses of the foam are useful for a variety of purposes, including flooring underlayment, mattress components, furniture components, insulating materials, and the like. In alternative embodiments, specific shapes may be cut out of either the foam or the sliced layers of the foam. The specific shapes may be cut out of the foam using a die or other cutting devices. In further alternative embodiments, the foam or a sliced layer of the foam can be cut into a convoluted or other complex shape using a convoluting machine. Of course, processing of the foam should not be limited to the foam processing methods described herein because persons of ordinary skill in the art are aware of foam processing methods other than the methods described herein.

FIG. 2 is a side view of an example of foam production line 200 for implementing method 100. The foam production line 200 comprises a plurality of storage tanks 202, the mixer 204, the trough 206, the fall plate 208, the conveyor 210, the knife 212, the vacuum table 214, exhaust piping 216, the pre-filter 218, the scrubber 220, a vacuum pump 222, and vent piping 224. Production of the foam 230 begins when the formulation components described hereinabove flow from the storage tanks 202 to the mixer 204. Although only three storage tanks 202 are depicted in FIG. 2, the foam production line 200 may be configured with any number of storage tanks 202 and generally includes one storage tank 202 for each formulation component. If desired, one or more pumps may be installed in the piping between the storage tanks 202 and the mixer 204 to facilitate transportation of the formulation components to the mixer 204. The mixer 204 then mixes the formulation components together. The mixer 204 may be a static mixer comprised of a plurality of baffles within the pipes or a dynamic mixer comprised of a plurality of moving agitators. After being mixed, the formulation is poured into the trough 206. If desired, one or more pumps may be installed in the piping between the mixer 204 and the trough 206 to facilitate transportation of the formulation to the trough 206. Alternatively, the formulation may gravity feed into the trough 206.

Once the formulation arrives in the trough 206, the gelling and blowing reactions begin to form the foam. The foam rises out of the trough 206, spills over onto the fall plate 208, and continues to rise as it progresses down the fall plate 208. The foam 230 eventually reaches the conveyor 210 and travels along the conveyor until the knife 212 is used to cut the foam 230 when it reaches a predetermined length, such as sixty feet. The foam 230 then moves along the conveyor 210 to the vacuum table 214 where ambient air is used to cool the foam 230. More specifically, the vacuum pump 222 draws air through the foam 230, into the vacuum table 214 as indicated by the arrows, and though the exhaust piping 216, the pre-filter 218, and the scrubber 220. The air then passes through the vacuum pump 222 and out the vent piping 224 where it is vented to the atmosphere. After being cooled, the foam 230 is transported, for example by crane, to an area for curing and further processing (not shown). A fume hood (not shown) is installed over the trough 206, the fall plate 208, and the conveyor 210 such that any vapors or fumes released from the foam 230 during its production are captured within the fume hood. The fumes and vapors captured in the fume hood are combined with the exhaust stream in the exhaust piping 216 and routed through the pre-filter 218 and the scrubber 220, before being vented to the atmosphere.

The scrubber 220 and the pre-filter 218 shown in FIG. 2 remove the VOCs from the exhaust stream so that the VOCs are not vented to the atmosphere. Several environmental agencies monitor the amount of VOCs that foam production facilities emit into the atmosphere, thus foam production facilities have to install scrubbers 220 to remove the VOCs from the exhaust stream before it is vented to the atmosphere. As the ambient air passes through the interior of the foam 230 and into the vacuum table 214, the air removes and carries with it the VOCs in the foam 230, including unused reactants from the gelling and/or blowing reactions, carbon dioxide, stabilizers, antioxidants, inert blowing agents, fluorocarbons, chlorofluorocarbons (CFCs), methylene chloride, acetone, trichloroethane, butylated hydroxytoluene (BHT), trace impurities from the raw materials, and other byproducts. Moreover, the exhaust stream can also include solid particulate matter drawn from the freshly produced foam and small pieces of foam that are vacuumed off of the foam 230. Although not harmful to the environment, the small pieces of foam are a nuisance and maintenance problem if discharged into the atmosphere. Thus, the solid portions of the exhaust stream are generally removed in the pre-filter 218, which comprises open cell polyurethane foam. Effective filtering of foam debris can also be accomplished using a woven or nonwoven fiber batt, a metal mesh, fiberglass, or other porous filter that will produce a minimum back pressure, or pressure drop across the pre-filter 218. The remaining undesirable substances in the exhaust stream, including the VOCs, are removed using the scrubber 220. The scrubber 220 comprises a bed of specialized activated carbon char that is specifically designed to adsorb the VOCs in the exhaust stream.

In an embodiment, the foam comprising vegetable oil polyol may display a variety of desirable characteristics, such as improved physical properties, when compared to otherwise identical foam lacking the vegetable oil polyol.

EXAMPLE ONE

In one embodiment, the foam was prepared using the formulation shown in Table 1:

TABLE 1

| Component | Example | Amount (pph) |
| --- | --- | --- |
| Polyol | Base 3000 MW Polyol (BASF) | 79 |
| Polyol | Polyol 3400 | 20 |

TABLE 1-continued

| Component | Example | Amount (pph) |
| --- | --- | --- |
| Isocyanate | TDI 80/20 | 49.37 |
| Fire Retardant | Melamine | 10 |
| Fire Retardant | CP-2 | 15.5 |
| Surfactant | L-650 | 0.85 |
| Catalyst | TCAT 150 | 0.35 |
| Catalyst | ZF-10 | 0.15 |
| Catalyst | C 324 | 0.15 |
| Water | Water | 3.5 |
| Anti-microbial | DM-50 | 0.25 |
| Color | Blue | 0.0043 |
| Color | Yellow | 0.0035 |
| Color | Orange | 0.0123 |

The formulation in Table 1 had an isocyanate index of 109.

EXAMPLE TWO

In one embodiment, the foam was prepared using the formulation shown in Table 2:

TABLE 2

| Component | Example | Amount (pph) |
| --- | --- | --- |
| Polyol | Base 3000 MW Polyol (BASF) | 79 |
| Polyol | Polyol 3400 | 20 |
| Isocyanate | TDI 80/20 | 49.37 |
| Fire Retardant | Melamine | 10 |
| Fire Retardant | HF-4 | 15.5 |
| Catalyst | TCAT 150 | 0.35 |
| Catalyst | ZF-10 | 0.15 |
| Catalyst | C 324 | 0.15 |
| Surfactant | L-650 | 0.85 |
| Water | Water | 3.5 |
| Anti-microbial | DM-50 | 0.25 |
| Color | Blue | 0.0043 |
| Color | Yellow | 0.0035 |
| Color | Orange | 0.0123 |

The formulation in Table 2 had an isocyanate index of 109.

EXAMPLE THREE

In one embodiment, the foam was prepared using the formulation shown in Table 3:

TABLE 3

| Component | Example | Amount (pph) |
| --- | --- | --- |
| Polyol | Base 3000 MW Polyol (BASF) | 79 |
| Polyol | Polyol 3400 | 20 |
| Isocyanate | TDI 80/20 | 49.96 |
| Fire Retardant | Melamine | 10 |
| Fire Retardant | HF-4 | 15.5 |
| Catalyst | TCAT 150 | 0.6 |
| Catalyst | ZF-10 | 0.15 |
| Catalyst | C 324 | 0.15 |
| Surfactant | L-650 | 0.85 |
| Water | Water | 3.6 |
| Anti-microbial | DM-50 | 0.25 |
| Color | Blue | 0.0043 |
| Color | Yellow | 0.0035 |
| Color | Orange | 0.0123 |

The formulation in Table 3 had an isocyanate index of 108.

EXAMPLE FOUR

In one embodiment, the foam was prepared using the formulation shown in Table 4:

TABLE 4

| Component | Example | Amount (pph) |
| --- | --- | --- |
| Polyol | Base 3000 MW Polyol (BASF) | 79 |
| Polyol | Polyol 3400 | 20 |
| Polyol | DP-1022 | 1 |
| Isocyanate | TDI 80/20 | 52.04 |
| Fire Retardant | Melamine | 10 |
| Fire Retardant | HF-4 | 15.5 |
| Catalyst | TCAT 150 | 0.68 |
| Catalyst | ZF-10 | 0.1 |
| Catalyst | C 324 | 0.2 |
| Surfactant | L-650 | 0.85 |
| Water | Water | 3.6 |
| Anti-microbial | DM-50 | 0.25 |
| Color | Blue | 0.0043 |
| Color | Yellow | 0.0035 |
| Color | Orange | 0.0123 |

The formulation in Table 4 had an isocyanate index of 108.

EXAMPLE FIVE

A fifth experiment was conducted using the formulations given in Examples 2 and 4. The laboratory tested the test samples for 50% and 90% compression sets, tensile strength, elongation, and density. The compression sets were tested in accordance with ASTM D-3574D-95. The tensile strength and elongation were tested in accordance with ASTM D-3574E-95. Finally, the density was tested in accordance with ASTM D-3574A-95. Tables 5 and 6 are the physical property test results for the samples produced using the vegetable oil polyol formulations given in Examples 2 and 4, respectively.

TABLE 5

|  | Density (pcf) | IFD (25%, pounds) | Airflow (cfm) | 50% C SET | 90% C SET |
| --- | --- | --- | --- | --- | --- |
| Top | 1.93 | 36.8 | 6 | 6.54 | 7.38 |
| Middle | 1.93 | 34.9 | 5.8 | 5.51 | 8.99 |
| Bottom | 1.98 | 31.3 | 5.2 | 4.24 | 10.41 |
| Avg. | 1.95 | 34.3 | 5.7 | 5.43 | 8.93 |
| High | 1.98 | 36.8 | 6 | 6.54 | 10.41 |
| Low | 1.93 | 31.3 | 5.2 | 4.21 | 7.38 |
| Range | 0.05 | 5.5 | 0.8 | 2.33 | 3.03 |
| Tensile Strength (pounds) |  |  | 12.68 |  |  |
| Tear Strength (pounds) |  |  | 2.55 |  |  |
| Elongation (5) |  |  | 155.91 |  |  |

TABLE 6

|  | Density (pcf) | IFD (25%, pounds) | Airflow (cfm) | 50% C SET | 90% C SET |
| --- | --- | --- | --- | --- | --- |
| Top | 1.8 | 30 | 3.2 | 8.69 | 57.71 |
| Middle | 1.85 | 34.2 | 2.1 | 15.1 | 49.09 |
| Bottom | 1.87 | 32 | 2 | 17.69 | 74.54 |
| Avg. | 1.84 | 32.1 | 2.43 | 13.83 | 60.45 |
| High | 1.87 | 34.2 | 3.2 | 07.69 | 74.54 |
| Low | 1.8 | 30 | 2.0 | 8.69 | 49.09 |
| Range | 0.07 | 4.2 | 1.2 | 9.0 | 25.45 |
| Tensile Strength (pounds) |  |  | 16.84 |  |  |
| Tear Strength (pounds) |  |  | 2.8 |  |  |
| Elongation (5) |  |  | 181.5 |  |  |

The fatigue loss in percent thickness for the formulation in Examples 2 and 4 are 2.94 and 1.5 percent respectively while the IFD was 24.5 pounds and 28.5 pounds respectively. The formulation given in Example 4 had no discernible odor.

The invention having been generally described, the following examples are given as particular embodiments of the invention and to demonstrate the practice and advantages thereof. It is understood that the examples are given by way of illustration and are not intended to limit the specification of the claims in any manner.

While preferred embodiments of the invention have been shown and described, modifications thereof can be made by one skilled in the art without departing from the spirit and teachings of the invention. Elements described herein in terms of percentages or parts are intended to be described as such in reference to weight, i.e. weight percent or parts by weight, respectively. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as "comprises", "includes", "having", and the like should be understood to provide support for narrower terms such as "consisting of", "consisting essentially of", "comprised substantially of" and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present disclosure. The discussion of a reference herein is not an admission that it is prior art to the present invention, especially any reference that may have a publication date after the priority date of this application. Finally, the disclosures of all patents, patent applications, and publications cited herein are hereby incorporated by reference, to the extent that they provide exemplary, procedural or other details supplementary to those set forth herein.

What is claimed is:

1. A viscoelastic polyurethane foam made from a formulation comprising between about 10.9 weight percent and about 11.8 weight percent of a castor oil polyol having a hydroxyl number between about 150 mg KOH/g and about 175 mg KOH/g and an acid value not more than about 3 mg KOH/g.

2. A viscoelastic polyurethane foam according to claim 1, further comprising an isocyanate and a surfactant.

3. A viscoelastic polyurethane foam according to claim 1, wherein the cured viscoelastic foam has a density of between about 1 pcf and about 10 pcf, a 25% IFD of between about 1 pound and about 30 pounds and a foam index from about 20 to about 130.

* * * * *